US007780180B2

(12) United States Patent
Hoepner et al.

(10) Patent No.: US 7,780,180 B2

(45) Date of Patent: Aug. 24, 2010

(54) KNEE WALKER

(76) Inventors: John M. Hoepner, 6420 Hazeltine National Dr., Orlando, FL (US) 32822; Ching-Hsu Lin, No. 11, Industrial South 6th Road, Nan Kang Industrial Zone, Nan Tou (TW) 540

( * ) Notice: Subject to any disclaimer, the term of this patent is extended or adjusted under 35 U.S.C. 154(b) by 135 days.

(21) Appl. No.: 11/845,302

(22) Filed: Aug. 27, 2007

(65) Prior Publication Data

US 2009/0058036 A1 Mar. 5, 2009

(51) Int. Cl.
*B62K 17/00* (2006.01)

(52) U.S. Cl. ............... 280/267; 280/87.021; 280/87.05; 280/263

(58) Field of Classification Search .............. 280/47.25, 280/47.38, 62, 87.01, 87.021, 87.041, 87.05, 280/87.051, 642, 647, 650, 651, 655, 655.1, 280/657, 658, 267; 482/66, 67, 68
See application file for complete search history.

(56) References Cited

U.S. PATENT DOCUMENTS

| | | | | | |
|---|---|---|---|---|---|
| 810,679 | A | * | 1/1906 | Rudert | 280/47.11 |
| 1,726,971 | A | * | 9/1929 | Yarian | 280/93.511 |
| 2,542,433 | A | * | 2/1951 | Rockman | 280/87.01 |
| 3,052,481 | A | * | 9/1962 | Kaufman | 280/7.1 |
| 4,415,054 | A | * | 11/1983 | Drutchas | 180/444 |
| 4,445,703 | A | * | 5/1984 | Tange | 280/279 |
| 4,460,197 | A | * | 7/1984 | Rogers | 280/86.758 |
| 4,861,051 | A | * | 8/1989 | Napper | 280/87.021 |
| 5,158,313 | A | * | 10/1992 | Becker | 280/87.021 |
| 5,340,142 | A | * | 8/1994 | Kuhns | 280/444 |
| 5,800,317 | A | * | 9/1998 | Accetta | 482/66 |
| 6,244,605 | B1 | * | 6/2001 | Liu | 280/87.041 |
| 6,341,672 | B1 | * | 1/2002 | Yang et al. | 188/20 |
| 6,491,312 | B2 | * | 12/2002 | Reynolds et al. | 280/87.041 |
| 6,494,469 | B1 | * | 12/2002 | Hara et al. | 280/87.041 |
| 6,622,587 | B1 | * | 9/2003 | Wu | 74/502.2 |
| 6,634,660 | B2 | * | 10/2003 | Miller | 280/87.021 |
| 6,647,825 | B1 | * | 11/2003 | Lin | 74/502.2 |
| 6,991,243 | B2 | * | 1/2006 | Boyle et al. | 280/87.05 |
| 7,077,422 | B2 | * | 7/2006 | Haury et al. | 280/647 |
| 7,287,767 | B1 | * | 10/2007 | Gomes et al. | 280/87.021 |
| 7,419,175 | B2 | * | 9/2008 | Smith | 280/221 |
| 2003/0188906 | A1 | * | 10/2003 | Bank | 180/210 |
| 2006/0237935 | A1 | * | 10/2006 | Lonkvist | 280/87.021 |
| 2007/0085285 | A1 | * | 4/2007 | Lindsay | 280/47.34 |
| 2007/0163633 | A1 | * | 7/2007 | Gale | 135/67 |
| 2007/0164529 | A1 | * | 7/2007 | Lin | 280/87.021 |
| 2007/0182116 | A1 | * | 8/2007 | Davey et al. | 280/87.05 |
| 2008/0284125 | A1 | * | 11/2008 | Ramm et al. | 280/263 |

* cited by examiner

*Primary Examiner*—Lesley Morris
*Assistant Examiner*—Brodie Follman
(74) *Attorney, Agent, or Firm*—Allen, Dyer, Doppelt, Milbrath & Gilchrist, P.A.

(57) ABSTRACT

A knee walker includes a frame; a cushion; a front crossmember; two rear wheels; two front spindles and two front wheels each pivotally connected to one of the two front spindles. Positive steering is provided by a handlebar rotatably connected to the front end of the frame; a steering gear responsively engaged with the rotatably connected handlebar shaft; a steering arm actuated by the steering gear responsive to the handlebar; a steering rod connecting the steering arm and one of the two front spindles, so as to pivot one associated front wheel responsive to the steering arm; and a tie rod linking the two front spindles responsively to the steering rod.

30 Claims, 11 Drawing Sheets

KNEE WALKER

FIELD OF THE INVENTION

The present invention relates to the field of ambulatory devices for the physically impaired and, more particularly, to a knee support walker apparatus.

BACKGROUND OF THE INVENTION

Many previously described devices provide walking assistance for those with physical impairments. Previous devices include wheel chairs, wheeled walkers and wheeled scooters, that is, a wheeled device which provides support for one knee or for the stump of an amputated limb, a type of device also known as a knee walker. Many of the prior devices include wheels which swivel so as to allow the user to guide the device in a desired direction or to make a turn. Typically, devices having more than one front wheel have employed static handlebars, that is, the user's hands rest on either handles or on a handlebar which does not turn to guide the direction of the device. Such static handlebars coupled with swiveling wheels still require that the user of a knee walker use his/her good leg to push the device in the new direction. This effort may also cause the user to employ body lean to affect the directional movement of the device, an action which could lead the user to lose balance and fall.

SUMMARY OF THE INVENTION

With the foregoing in mind, the present invention advantageously provides a knee walker which offers the user positive steering control and greatly reduces the effort required from the user to change the directional movement of the device.

Accordingly, the present invention provides a knee walker comprising a frame having a front end and a rear end spaced apart therefrom. A cushion is supported on an upper side of the frame, preferably on a height adjustable post. A front crossmember is supported on a lower side of the front end of the frame and extends laterally outwardly therefrom. Two rear wheels are rotatably connected adjacent the rear end of the frame. The knee walker includes two front spindles, each positioned at an end of the front crossmember and approximately perpendicular thereto. Two front wheels are each pivotally connected to one of the two front spindles, the two front wheels farther spaced apart than the two rear wheels. A handlebar is borne at an upper end of a height adjustable shaft rotatably connected to the front end of the frame. A steering gear is located at the front end of the frame and is responsively engaged with the rotatable handlebar shaft. A steering arm is actuated by the steering gear responsive to the handlebar and its motion is transferred to the front wheels by a steering rod connecting the steering arm and one of the two front spindles, so as to pivot one associated front wheel responsive to the steering arm. The steering system includes a tie rod which links the two front spindles together, responsively to the steering rod. Accordingly, as the one wheel pivots, the tie rod steering linkage actuates the second wheel to pivot as well, thereby allowing the knee walker to turn. The tie rod linkage prevents the front wheels from turning beyond a certain degree of pivot, thereby guarding against user oversteering which could cause a loss of balance and a fall.

BRIEF DESCRIPTION OF THE DRAWINGS

Some of the features, advantages, and benefits of the present invention having been stated, others will become apparent as the description proceeds when taken in conjunction with the accompanying drawings, presented solely for exemplary purposes and not with intent to limit the invention thereto, and in which.

DETAILED DESCRIPTION OF THE PREFERRED EMBODIMENT

Figure 1:
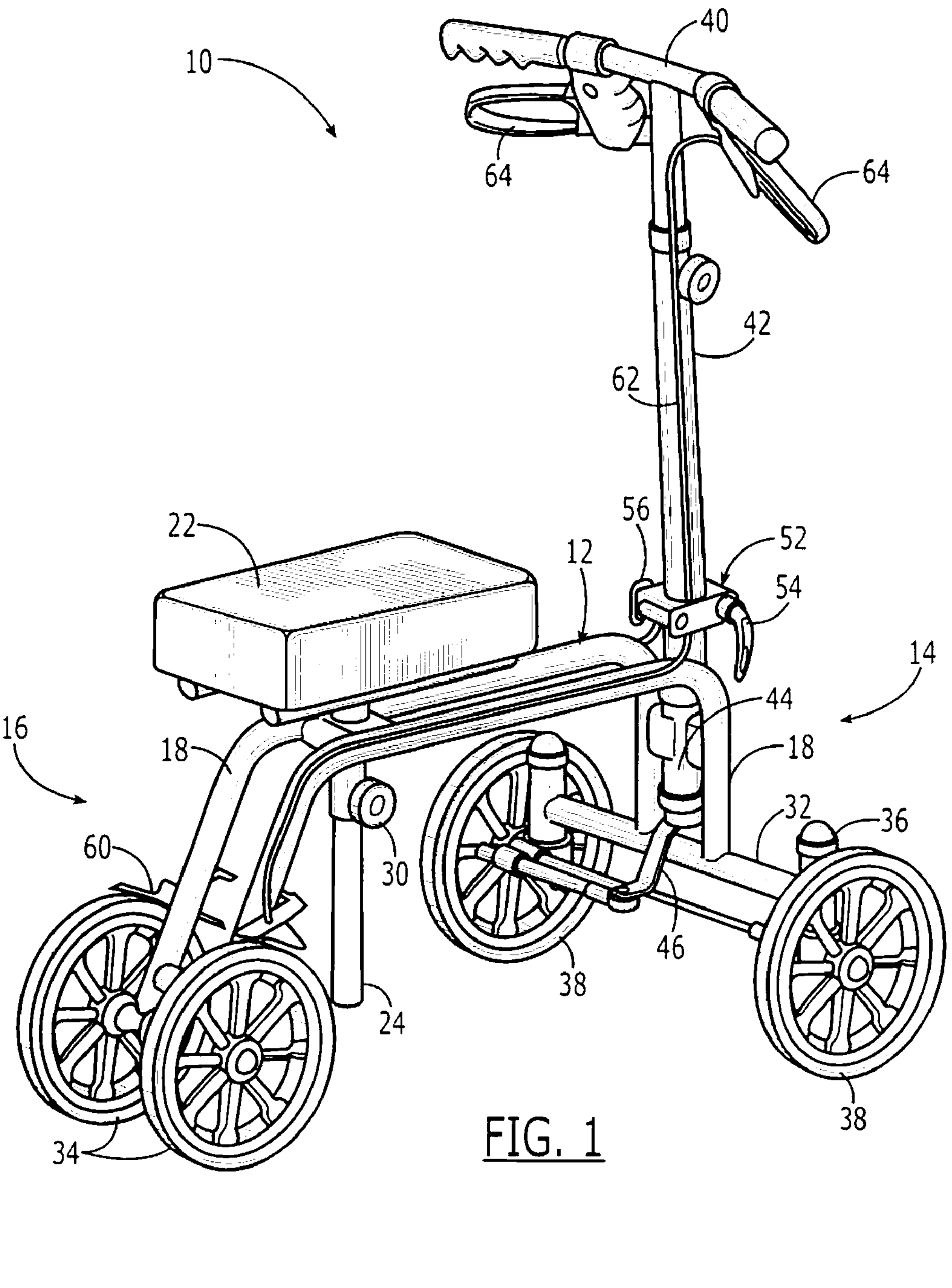
FIG. 1 is a rear quarter perspective view of the knee walker according to an embodiment of the present invention.

The present invention will now be described more fully hereinafter with reference to the accompanying drawings, in which preferred embodiments of the invention are shown. Unless otherwise defined, technical and scientific terms used herein have the same meaning as commonly understood by one of ordinary skill in the art to which this invention pertains. Although methods and materials similar or equivalent to those described herein can be used in the practice or testing of the present invention, suitable methods and materials are described below. In addition, the materials, methods and examples given are illustrative in nature only and not intended to be limiting. Accordingly, this invention may be embodied in many different forms and should not be construed as limited to the illustrated embodiments set forth herein. Rather, these illustrated embodiments are provided solely for exemplary purposes so that this disclosure will be thorough and complete, and will fully convey the scope of the invention to those skilled in the art. Other features and advantages of the invention will be apparent from the following detailed description, and from the claims.

FIGS. 1-8 illustrate a knee walker 10 according to the present invention. The knee walker 10 includes a frame 12 having a front end 14 and a rear end 16 spaced apart therefrom. The frame 12 may be fabricated of any suitable material and using frame members 18 of any suitable shape. However, for strength and lightness, the frame 12 would be best fabricated of a strong but light-weight aluminum alloy tubular members similar to those used in racing bicycles, as shown in the figures. Preferably, the frame 12 may be fabricated from two tubular frame members 18 arranged generally parallel to each other for added strength and stability of the device. The frame 12 may additionally have one or more crossmembers 20 joining the parallel tubes for added strength.

Figure 2:
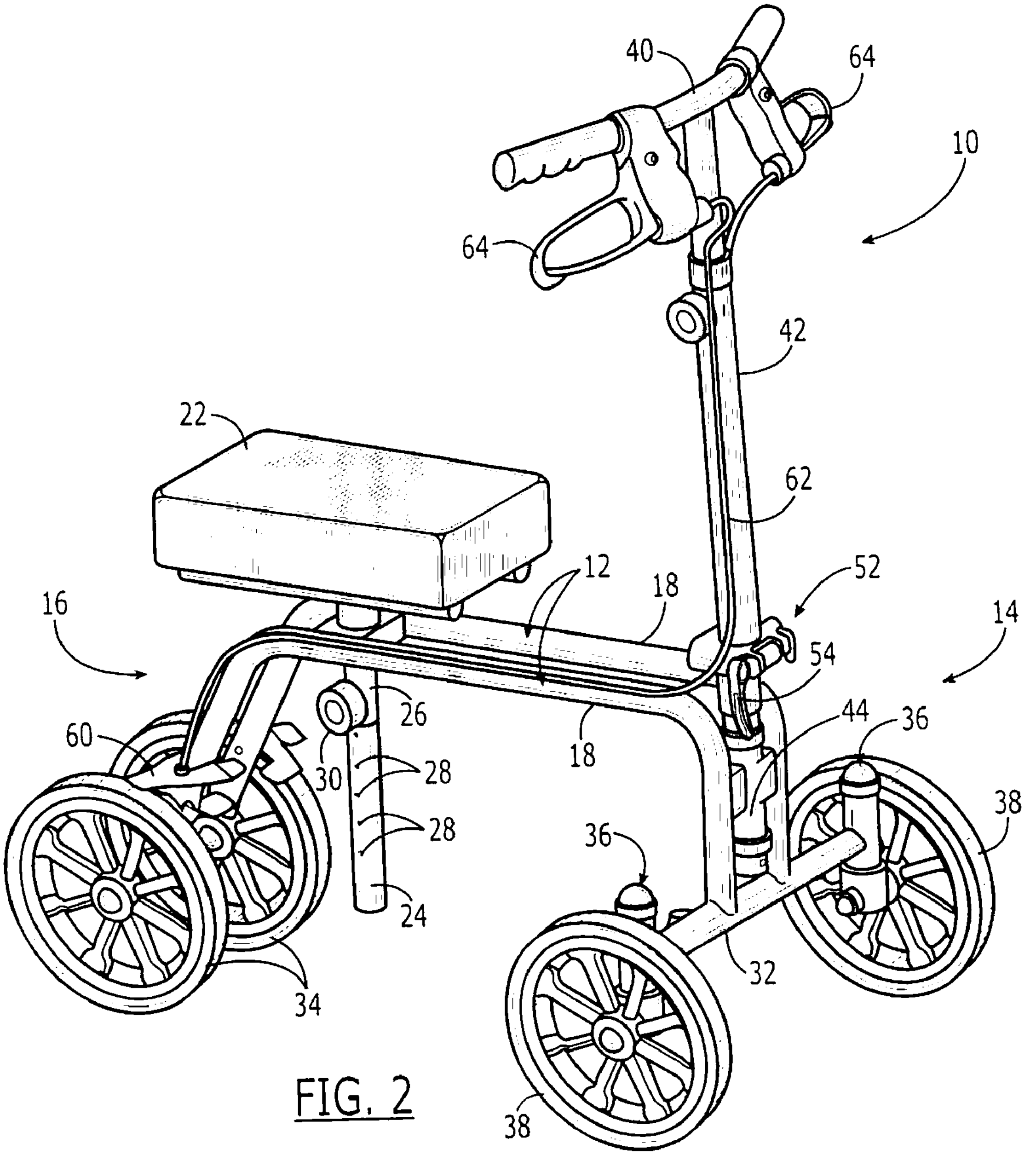
FIG. 2 is a front quarter perspective view of the knee walker of FIG. 1.
Figure 3:
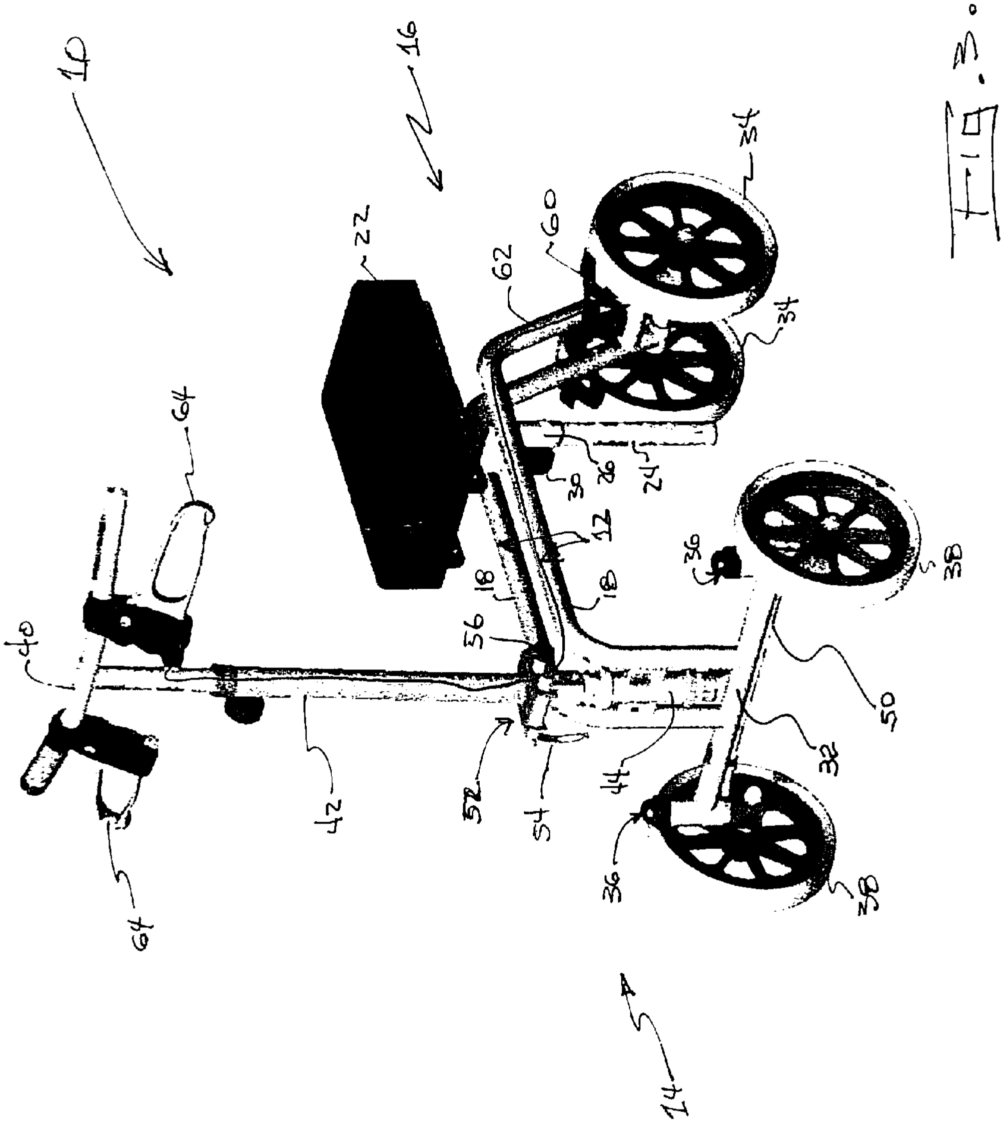
FIG. 3 shows a front quarter perspective view of the knee walker and generally opposite to FIG. 2.
Figure 4:
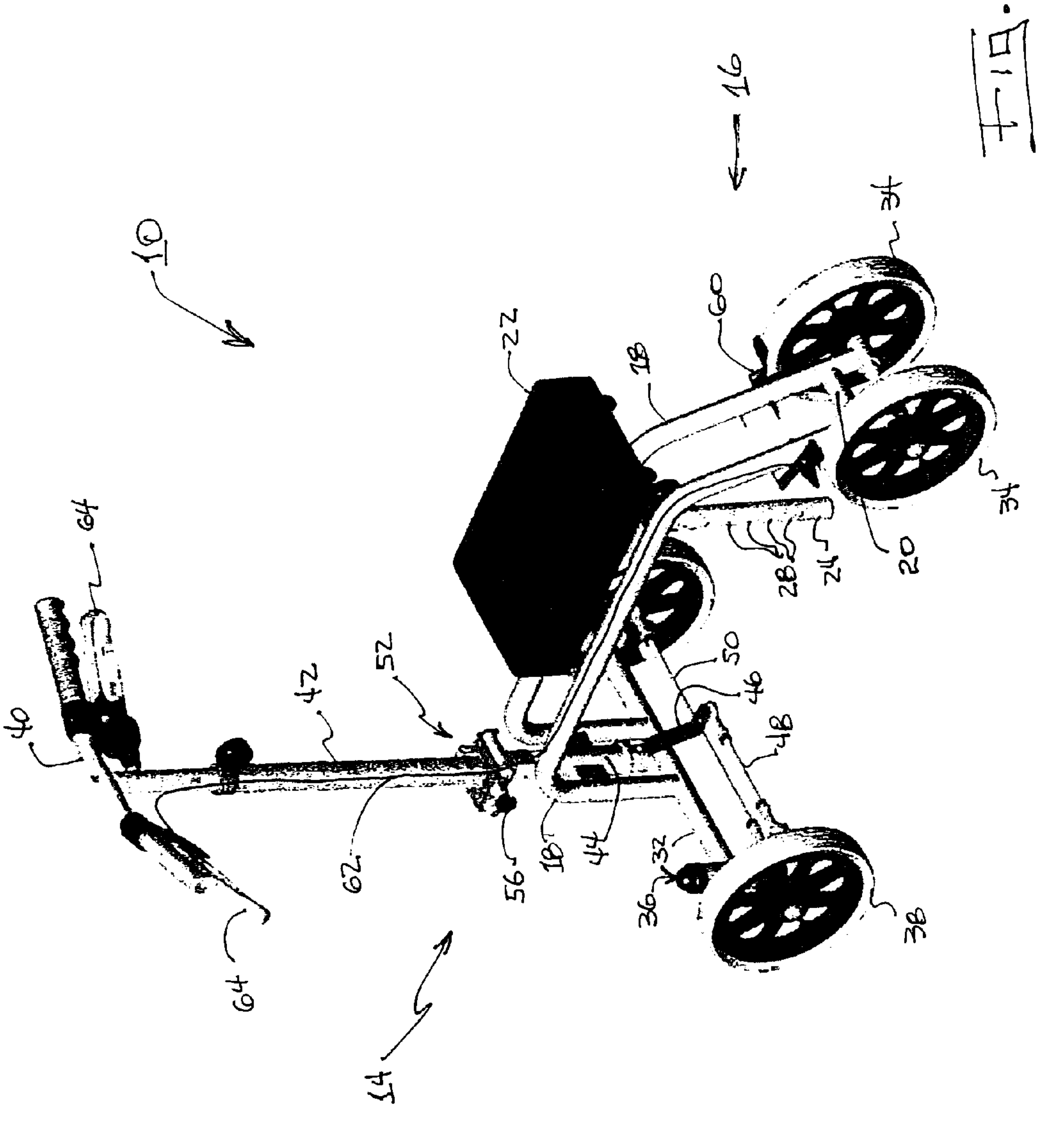
FIG. 4 is a rear quarter perspective view of the knee walker of FIG. 1, showing additional detail of the steering system.
Figure 5:
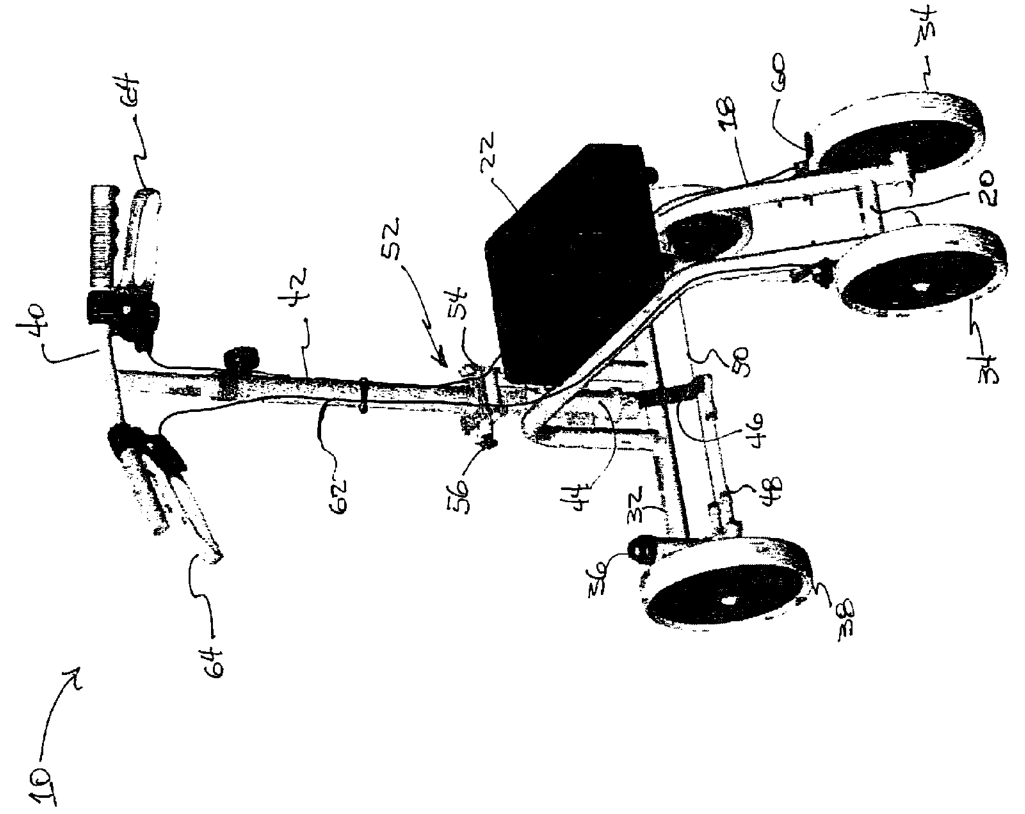
FIG. 5 a rear perspective view of the knee walker of FIG. 4, but from a more rearward perspective.

The knee walker 10 also includes a cushion 22 supported on an upper side of the frame 12. It should be understood that the frame 12 described above is set so that it will support the cushion 22 at an appropriate height for a user to rest a knee or a leg stump thereon. Preferably, the cushion 22 is also supported on a height-adjustable post, as best seen in FIGS. 1 and 2. Height adjustment of the cushion 22 relative to the frame 12 may be accomplished by any mechanism as known to the skilled, for example, a pull-pin insertable in openings drilled at 1" intervals along the support post, as shown in FIGS. 1-4. In another example, the cushion post 24 is supported by and slides through an outer tube 26 connected to the frame 12. Both cushion post 24 and outer tube 26 may have a series of spaced apart openings 28, as noted above, and a spring-loaded knob 30 which actuates a detent pin (not shown) and which locks the cushion post 24 to the outer tube 26 at a desired height.

The knee walker 10 apparatus also includes a front crossmember 32 supported on a lower side of the front end 14 of the frame 12 and extending laterally outwardly therefrom. Two rear wheels 34 are each connected adjacent the rear end 16 of the frame 12. Two front spindles 36 are each positioned at an end of the front crossmember 32 and approximately perpendicular thereto. Two front wheels 38 are each pivotally connected to one of the two front spindles 36. The two front wheels 38 are preferably farther spaced apart than the two rear wheels 34, as illustrated in FIGS. 1-5.

Positive steering is provided by a handlebar 40 borne at an upper end of a height adjustable shaft rotatably connected to the front end 14 of the frame 12. A steering gear 44 is supported at the front end 14 of the frame 12 and responsively engaged with the rotatably connected handlebar shaft. A steering arm 46 is actuated by the steering gear 44 responsive to the handlebar 40. A steering rod 48 is positioned connecting the steering arm 46 and one of the two front spindles 36, so as to pivot one associated front wheel 38 responsive to the steering arm 46. A tie rod 50 links the two front spindles 36 responsively to the steering rod 48. In this arrangement, when the user turns the handlebar 40 the turning motion is transmitted down to handlebar shaft 42 to the steering gear 44, from there to the steering arm 46, then to the steering rod 48 and to one of the wheel spindles 36, thereby urging the wheel to turn responsively to the handlebar 40. The tie rod 50 transmits motion from the first wheel spindle to the second wheel spindle, causing the second wheel to turn simultaneously with the first. It should be understood that while these linkage members are referred to as a steering rod and a tie rod, the linkage members don't necessarily have to be rods but may be any other structural member which accomplishes the purpose of steering the knee walker.

In one embodiment of the knee walker, the steering gear 44 comprises ball bearings to promote smooth functioning. In a preferred embodiment of the invention, as shown in FIGS. 1-5, the front wheels 38 are spaced apart at least twice the distance between the rear wheels 34. This wheel arrangement increases the stability of the knee walker 10, particularly as it is being turned by the user. Moreover, in particular it is pointed out to the skilled that this steering linkage arrangement prevents the user from oversteering, that is, from turning the wheels too sharply, which would likely lead to a loss of balance and a fall.

The handlebar 40 is generally T-shaped, as shown in the figures. In a preferred embodiment of the knee walker 10, however, the ends of the handlebar are offset toward the rear end 16 of the frame 12. Since the user will be slightly off-center relative to the frame 12 of the knee walker 10, having the handlebar 40 offset at the ends makes it a bit easier for the user to hold the handlebar and contributes to increasing the user's stability.

Figure 6B:
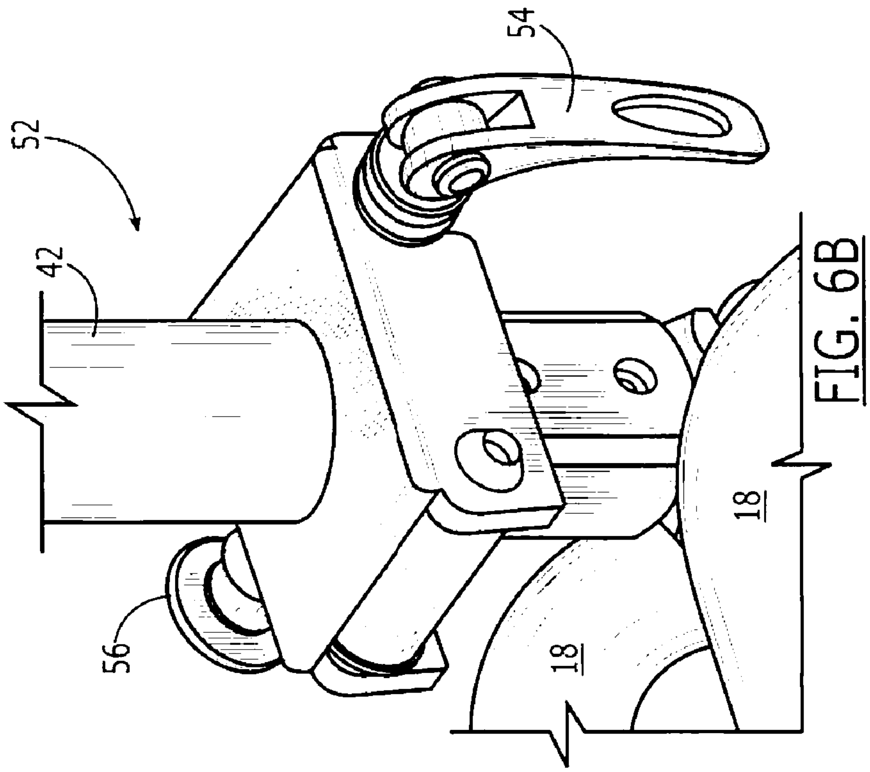
FIG. 6 shows perspective views of two sides (A and B) of a folding joint in the handlebar shaft of the knee walker of FIG. 1.
Figure 6A:
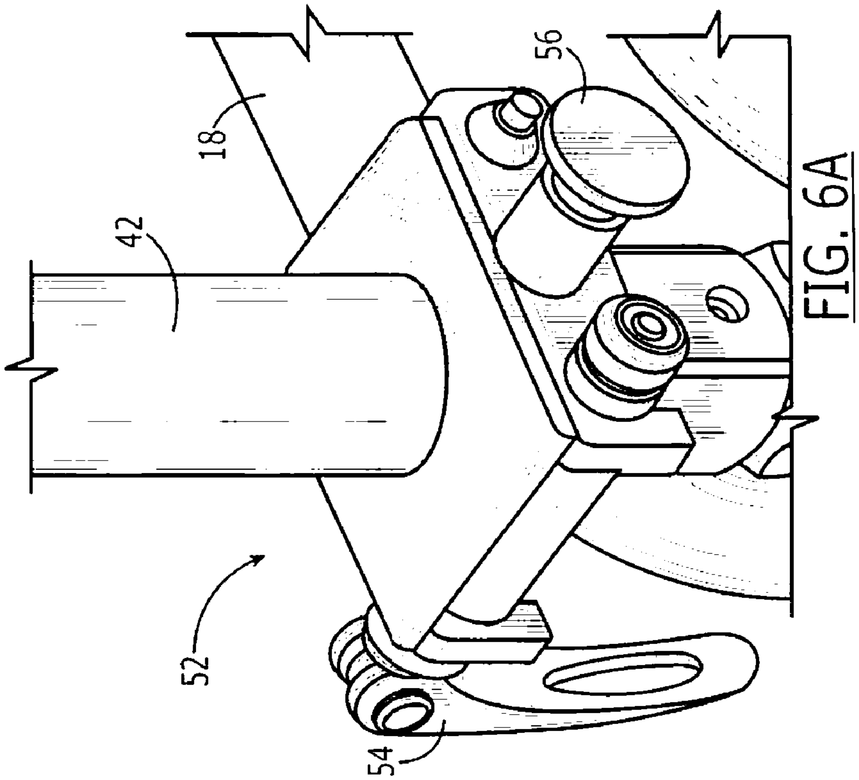
Figure 7B:
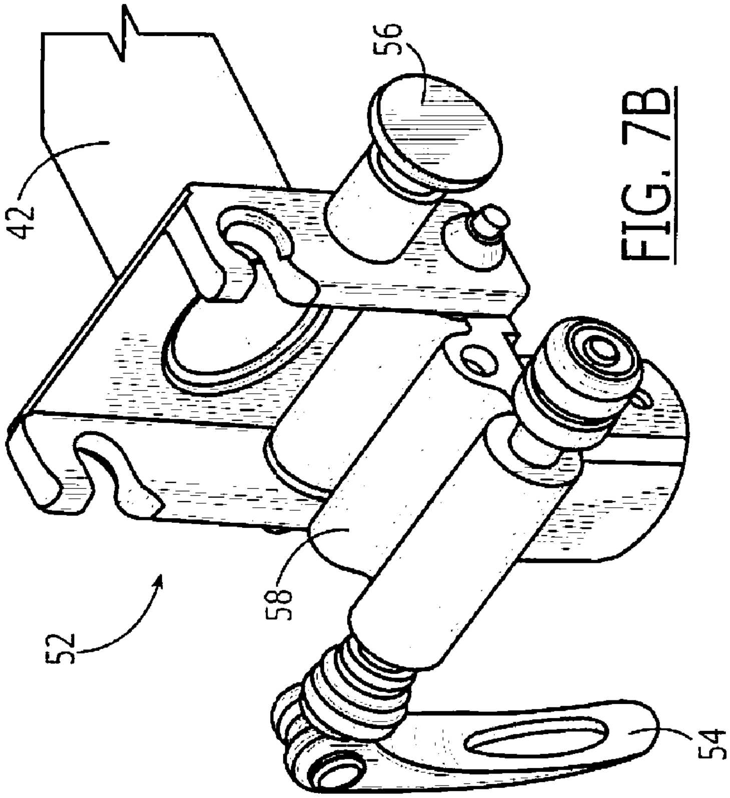
FIG. 7 illustrates the folding joint shown in FIG. 6 in both closed (A) and open (B) positions, the joint being open when the handlebar is folded down.
Figure 7A:
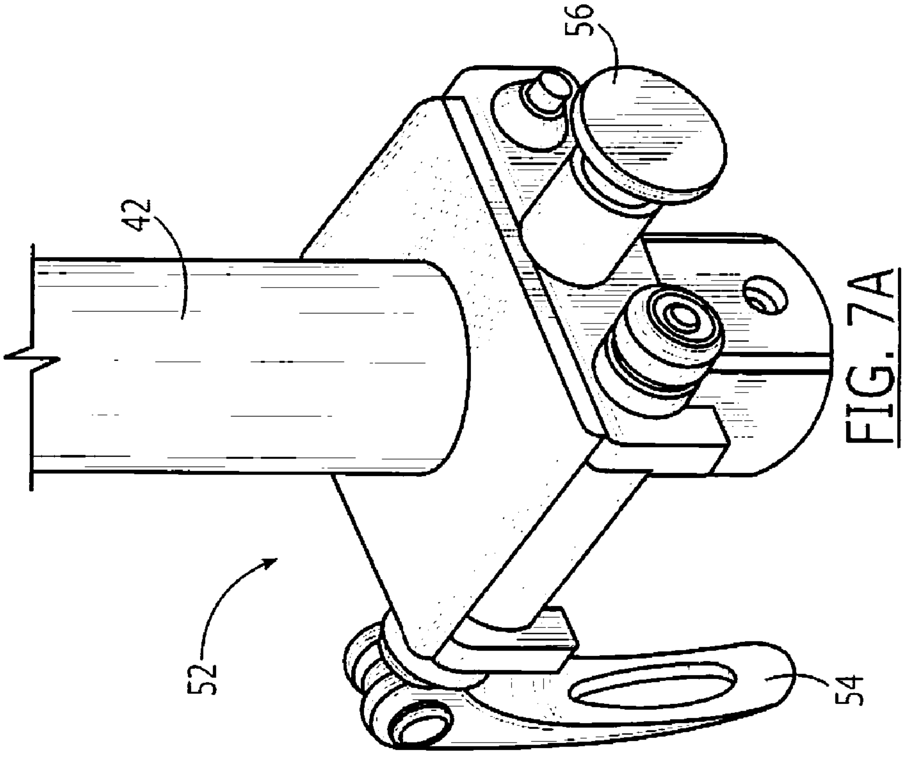
Figure 8B:
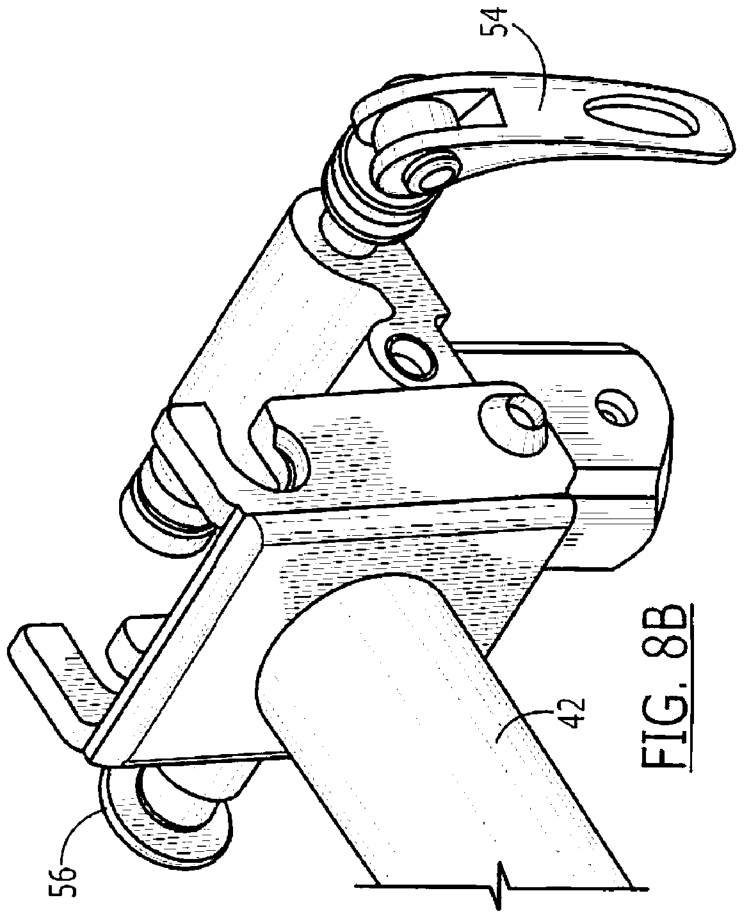
FIG. 8 shows the folding joint in closed (A) and open (B) positions, but from the opposite side of the drawings shown in FIG. 7.
Figure 8A:
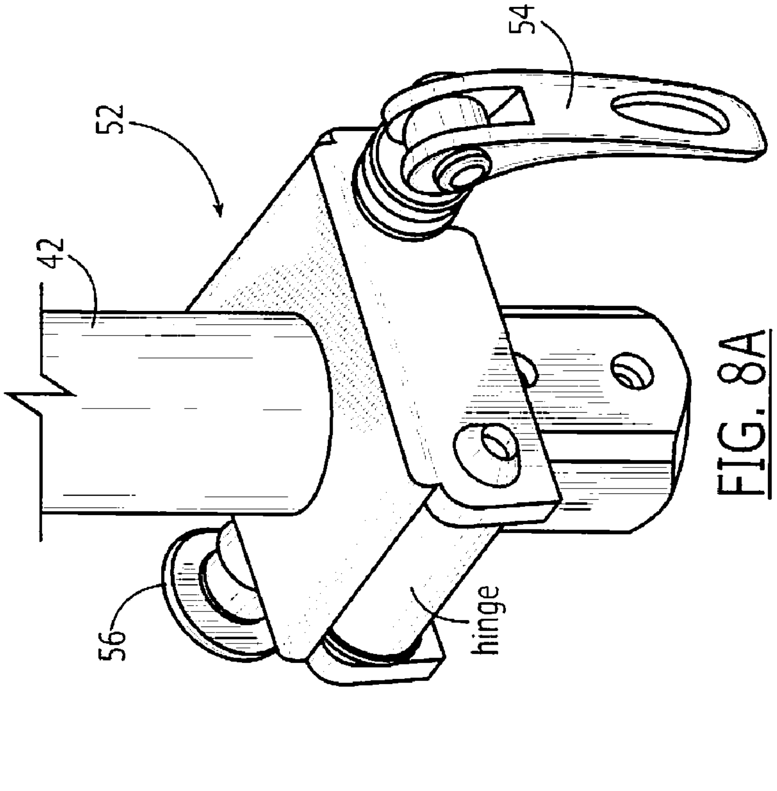
Figure 9D:
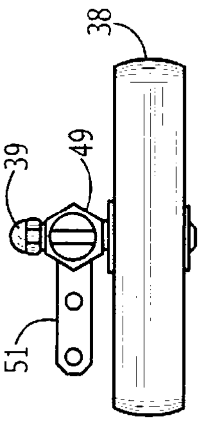
FIG. 9 depicts various views of the front wheel assembly of the knee walker of FIG. 1.
Figure 9H:
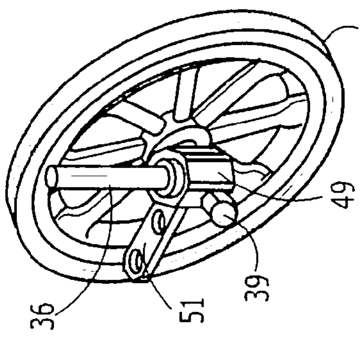
Figure 9C:
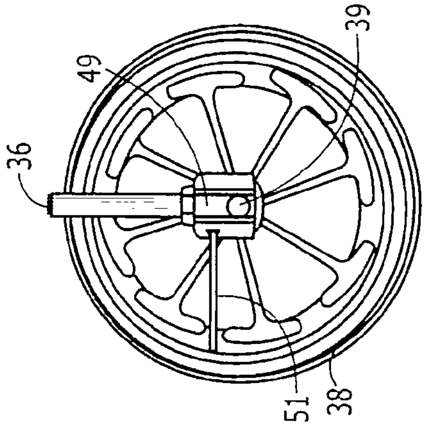
Figure 9G:
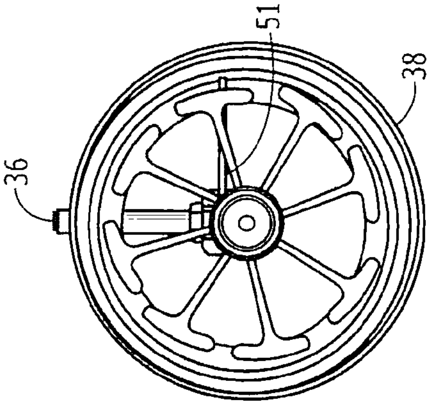
Figure 9B:
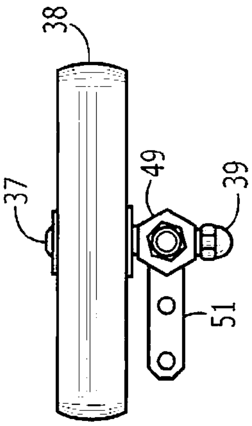
Figure 9F:
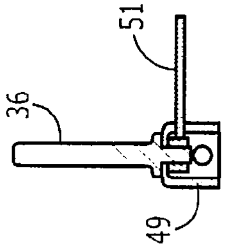
Figure 9E:
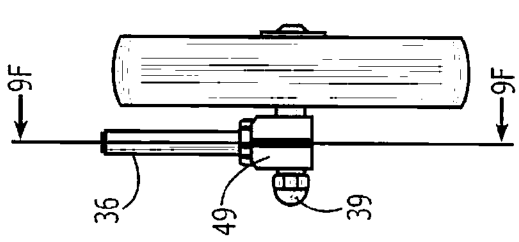
Figure 9A:
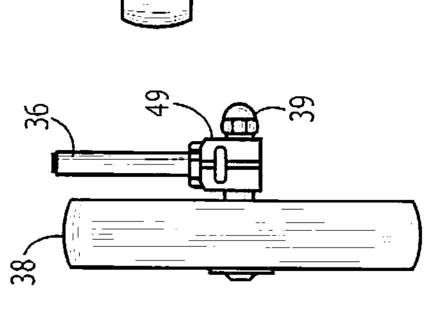

The handlebar shaft 42 in a most preferred embodiment of the invention includes a folding joint 52 so that the shaft may be folded thereabout. The folding joint 52 is similar to the type used in folding bicycles and is illustrated in FIGS. 6-8. The folding joint 52 is locked by a quick-release lever 54 but additionally also includes a second quick-release knob 56 actuated pin stopper, which provides an extra measure of protection against an unanticipated opening of the joint. The structural details of this additional locking device in the folding joint 52 are best seen in FIG. 7. The quick release knob 56 may be spring actuated so that its default position is with the pin portion protruding so as to matingly couple with the receiver 58 positioned inside the folding join, as generally shown in FIG. 7.

According to the invention, the knee walker 10 preferably also comprises a friction brake 60 positioned to stop at least one of the two rear wheels 34, the brake actuated by a cable 62 operably connected to a loop handle 64 supported on the handlebar 40. The brake 60 in a most preferred embodiment has a manually actuated loop handle 64 which surrounds the user's hand so as to prevent the hand from slipping off the brake handle. Such a loop handle 64 is shown in FIGS. 1-5. The knee walker 10 may additionally include a mechanical member or friction brake 60 positioned to physically lock at least one wheel, functioning as a parking brake.

Figures 10A, 10B, 10C, 10D, 10E, 10F, 10G:
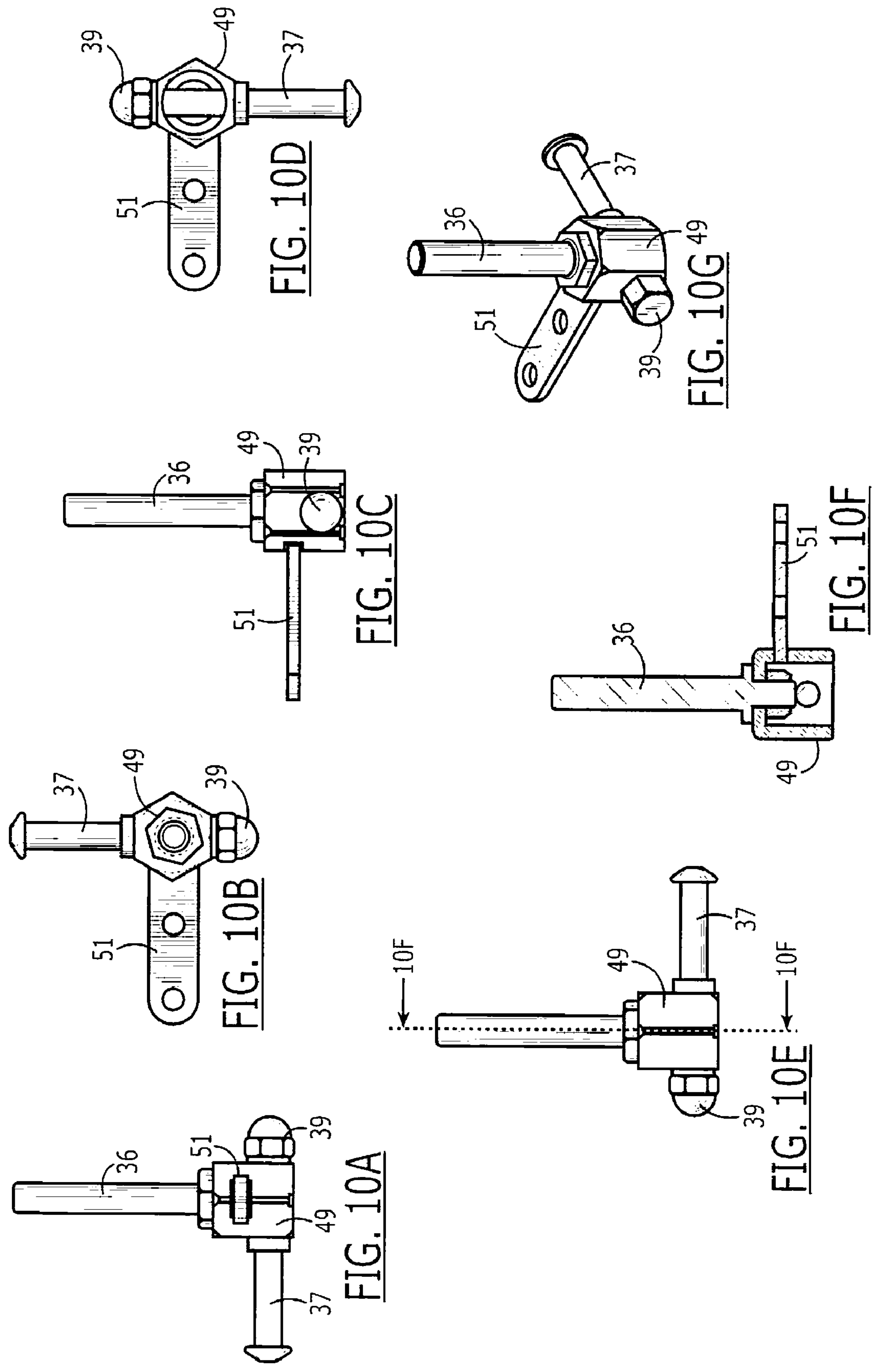
FIG. 10 provides additional detailed views of the spindles and wheel axes of the front wheels of the present knee walker.
Figures 11A, 11B, 11C, 11D, 11E, 11F, 11G:
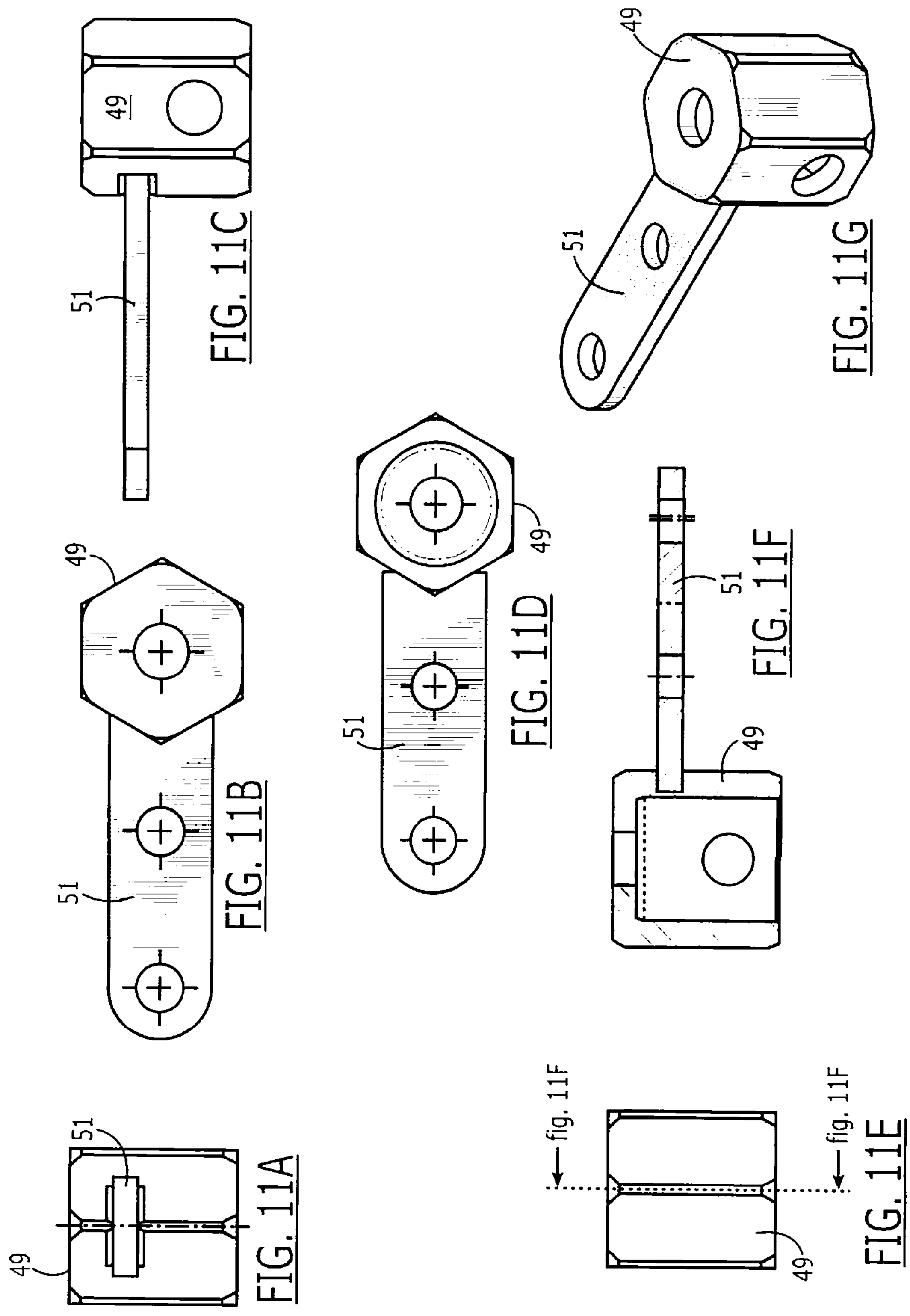
FIG. 11 continues from FIG. 10 by showing details of the steering linkage engagement with the front wheel axles.

Additional details of the front wheels and associated linkages are shown in FIGS. 9-11. FIG. 9 shows various views of the front wheels of the present walker, showing how wheel spindle 36 connects to wheel axle 37 via the spindle-axle nut 49. A front wheel axle nut 39 helps retain the wheel on the axle. Rod connector member 51 engages with spindle-axle nut 49 to transmit directional motion to the wheel from the steering rod 48 and tie rod 50. FIG. 10 shows further details of the structural relationship between wheel spindle 36, spindle-axle nut 49, wheel axle 37 and rod connector member 51. Further detail of these structural components are shown in FIG. 11, where the relationship of spindle-axle nut 49 and rod connector member 51 are shown in various views.

Accordingly, in the drawings and specification there have been disclosed typical preferred embodiments of the invention and, although specific terms may have been employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as recited in the appended claims.

That which is claimed:

1. A knee walker comprising:

a frame having two spaced apart and generally parallel members, a front end and a rear end spaced apart therefrom;

a cushion supported on an upper side of said frame;

a front crossmember supported on a lower side of the front end of said frame and extending laterally outwardly therefrom;

two rear wheels, each rotatably connected adjacent the rear end of said frame;

two front spindles, each positioned at an end of said front crossmember and approximately perpendicular thereto;

two front wheels each pivotally connected to one of said two front spindles, said two front wheels farther spaced apart than said two rear wheels;

a handlebar borne at an upper end of a height adjustable shaft rotatably connected at the front end of said frame;

a steering gear supported at the front end of said frame and responsively engaged with said rotatably connected handlebar shaft;

a steering arm actuated by said steering gear responsive to said handlebar;

a steering rod connecting said steering arm and one of said two front spindles, so as to pivot a first front wheel responsive to said steering arm; and a tie rod linking said two front spindles responsively to said steering rod so as to pivot a second front wheel responsive to said steering arm.

2. The knee walker of claim 1, wherein said spaced apart and generally parallel members are tubular.

3. The knee walker of claim 1, wherein said steering gear comprises ball bearings.

4. The knee walker of claim 1, further comprising a friction brake positioned to stop at least one of said two rear wheels, said brake actuated by a cable operably connected to a loop handle supported on said handlebar.

5. The knee walker of claim 1, further comprising a friction brake having a manually actuated loop handle which surrounds the user's hand so as to prevent the hand from slipping off the brake handle.

6. The knee walker of claim 1, further comprising at least one mechanical member positioned to physically lock at least one wheel as a parking brake.

7. The knee walker of claim 1, wherein the handlebar shaft further comprises a folding joint so that said shaft may be folded thereabout.

8. The knee walker of claim 1, wherein said cushion is supported on a height adjustable post connected to said frame.

9. The knee walker of claim 1, wherein said handlebar is generally T-shaped and has ends that are offset toward the rear end of said frame.

10. The knee walker of claim 1, wherein said front wheels are spaced apart at least twice the distance between said rear wheels.

11. A knee walker comprising:

a frame having two spaced apart and generally parallel members, a front end and a rear end spaced apart therefrom;

a front crossmember on the front end of said frame;

two rear wheels rotatably borne at the rear end of said frame;

two front spindles, each positioned at an end of said front crossmember;

two front wheels each pivotally connected to one of said two front spindles;

a handlebar having a shaft rotatably connected at the front end of said frame;

a steering arm actuated by turning of the handlebar shaft;

a first member linking said steering arm and a first of said two front spindles, thereby pivoting the front wheel connected thereto; and a second member linking the first front spindle with the second front spindle.

12. The knee walker of claim 11, wherein said frame comprises two tubular members.

13. The knee walker of claim 11, further comprising a steering gear engaged with the handlebar shaft and responsive thereto.

14. The knee walker of claim 11, further comprising a friction brake positioned to stop at least one of said two rear wheels, said brake actuated by a cable operably connected to a loop handle supported on said handlebar.

15. The knee walker of claim 11, further comprising a friction brake having a manually actuated loop handle which surrounds the user's hand so as to prevent the hand from slipping off the brake handle.

16. The knee walker of claim 11, further comprising at least one mechanical member positioned to physically lock at least one wheel as a parking brake.

17. The knee walker of claim 11, wherein the handlebar shaft further comprises a folding joint so that said shaft may be folded thereabout.

18. The knee walker of claim 11, wherein said cushion is supported on a height adjustable post connected to said frame.

19. The knee walker of claim 11, wherein said handlebar is generally T-shaped and has ends that are offset toward the rear end of said frame.

20. The knee walker of claim 11, wherein said front wheels are spaced apart at least twice the distance between said rear wheels.

21. A knee walker comprising:

a frame having two spaced apart and generally parallel members, a front end and a spaced apart rear end;

at least one rear wheel rotatably connected at the rear end of said frame;

a front crossmember at the front end of said frame;

first and second front spindles, each positioned at an end of said front crossmember;

two front wheels each pivotally connected to one of said first and second front spindles;

a handlebar having a shaft rotatably connected at the front end of said frame;

a steering gear engaged with said rotatable shaft;

a steering arm actuated by said steering gear;

a first steering link operably connecting said steering arm to the first spindle, to thereby turn a first front wheel; and a second steering link operably connecting the first front spindle with the second front spindle.

22. The knee walker of claim 21, wherein said frame comprises two tubular members.

23. The knee walker of claim 21, wherein said steering gear comprises ball bearings.

24. The knee walker of claim 21, further comprising a friction brake positioned to stop at least one of said two rear wheels, said brake actuated by a cable operably connected to a loop handle supported on said handlebar.

25. The knee walker of claim 21, further comprising a friction brake having a manually actuated loop handle which surrounds the user's hand so as to prevent the hand from slipping off the brake handle.

26. The knee walker of claim 21, further comprising at least one mechanical member positioned to physically lock at least one wheel as a parking brake.

27. The knee walker of claim 21, wherein the handlebar shaft further comprises a folding joint so that said shaft may be folded thereabout.

28. The knee walker of claim 21, wherein said cushion is supported on a height adjustable post connected to said frame.

29. The knee walker of claim 21, wherein said handlebar is generally T-shaped and has ends that are offset toward the rear end of said frame.

30. The knee walker of claim 21, wherein said front wheels are spaced apart at least twice the distance between said rear wheels.

* * * * *